RECORDING APPARATUS

Filed May 4, 1967 6 Sheets-Sheet 2

INVENTORS.
HAROLD J. BRIKOWSKI
TOMMY N. TYLER
BY
John Shaw Stevenson
AGENT.

INVENTOR
HAROLD J. BRIKOWSKI
TOMMY N. TYLER
BY John Shaw Stevenson
AGENT.

RECORDING APPARATUS

Filed May 4, 1967 6 Sheets-Sheet 1

INVENTORS.
HAROLD J. BRIKOWSKI
TOMMY N. TYLER
BY John Shaw Stevenson
AGENT.

July 7, 1970 T. N. TYLER ET AL 3,519,215

RECORDING APPARATUS

Filed May 4, 1967 6 Sheets-Sheet 5

INVENTORS.
HAROLD J. BRIKOWSKI
TOMMY N. TYLER

BY John Shaw Stevenson

AGENT.

July 7, 1970 T. N. TYLER ET AL 3,519,215

RECORDING APPARATUS

Filed May 4, 1967 6 Sheets-Sheet 6

INVENTORS.
HAROLD J. BRIKOWSKI
TOMMY N. TYLER
BY
John Shaw Stevenson
AGENT.

United States Patent Office 3,519,215
Patented July 7, 1970

3,519,215

RECORDING APPARATUS

Tommy N. Tyler, Littleton, and Harold J. Brikowski, Englewood, Colo., assignors to Honeywell Inc., Minneapolis, Minn., a corporation of Delaware Filed May 4, 1967, Ser. No. 636,070
Int. Cl. B65h 17/08, 17/12
U.S. Cl. 242—67.4 6 Claims

ABSTRACT OF THE DISCLOSURE

An apparatus for maintaining the proper tension in a chart as it is moved directly at any one of a selected number of different speeds in an unwinding direction from a supply spindle to a take-up spindle and in reverse (rewinding) direction in order to prevent undesired transverse movement, buckling and rupture of the chart from taking place which comprises an electro-mechanically actuated mechanism to:

(1) Move a first drive roller driven at one of a selected number of speeds into driving engagement against an outer surface of the chart that is wound on the take-up spindle and simultaneously move a second drive roller being driven at the selected speed out of its driving contact with the outer surface of the chart that is wound on the supply when the chart is being moved from the supply to the take-up spindle and (2) To move the first (take up) roller out of driving contact with the surface of the chart on the take-up spindle and the second roller simultaneously into driving engagement against the supply spool when the chart is moved in a reverse (rewinding) direction from the take-up to the supply spindle.

It is an object of the present invention to disclose a unitary drive and tensioning apparatus of the aforementioned type which is capable of moving a chart at record speeds of 0.1 i.p.s. to 160 i.p.s. between a supply and a take-up spool without being required to follow the old practice of varying the driving input to the paper rolls.

Studies of the presently available paper surface drives for charts have shown that when paper unrolls from a paper roll with a driving roll applied to its outside diameter, the roll will build up one or more layers of loose paper on the roll. This loose paper will inject a disturbance into the paper drive that will eventually drive the paper laterally to the point of paper drive failure and rupture.

It is therefore an object of the invention to disclose a unitary arm lift drive and tensioning apparatus that lifts the drive roller from the unrolling paper roll and thereby eliminates the aforementioned loop buildup.

It is another object of the invention to disclose improved chart drive rolls for the chart paper wrapped about the supply and take-up spindles that will enable the force and friction applied by these drive rolls to be at an efficient maximum value which will not exceed the frictional force between the layers of the roll of paper on which the chart drive roll is in rotatable contact and thereby prevent rupture of the chart from occurring.

It is another object of the invention to disclose an apparatus of the aforementioned type that will enable an operator to introduce an abnormally high tension in the drive roll driven paper and in this way provide greater drive stability in the paper as it is moved between the spindles than has heretofore been possible.

It is another object of the invention to disclose a drive and tensioning apparatus of the aforementioned type which employs a construction employing flangeless supply and take-up paper roller cores and spindles rather than the conventional flanged spools mounted on shafts to thereby provide a more easy way of loading and unloading paper than has herebefore been possible.

It is another object of the present invention to disclose an apparatus that eliminates errors due to misalignment by providing a common shaft about which the rollers that are employed to drive the paper on the supply and take-up spindles, a squaring roller for the take-up spool and a cradle are rotatably mounted.

It is another object of the invention to disclose improved chart drive rolls for the chart paper wrapped about the supply and take-up spindles that will enable the force and friction applied by these drive rolls to be at an efficient maximum value which will not exceed the frictional force between the layers of the roll of paper on which the chart drive roll is in rotatable contact and thereby prevent rupture of the chart from overrunning.

A better understanding of the present invention may be had for the following detailed description when read in connection with the accompanying drawings in which:

FIG. 1 shows a block diagram of how FIGS. 1A and 1B are assembled;

FIG. 1A discloses an exploded isometric view of the left end portion of the paper drive;

FIG. 1B discloses an exploded isometric view of the right end portion of the paper drive;

Figure 1A:
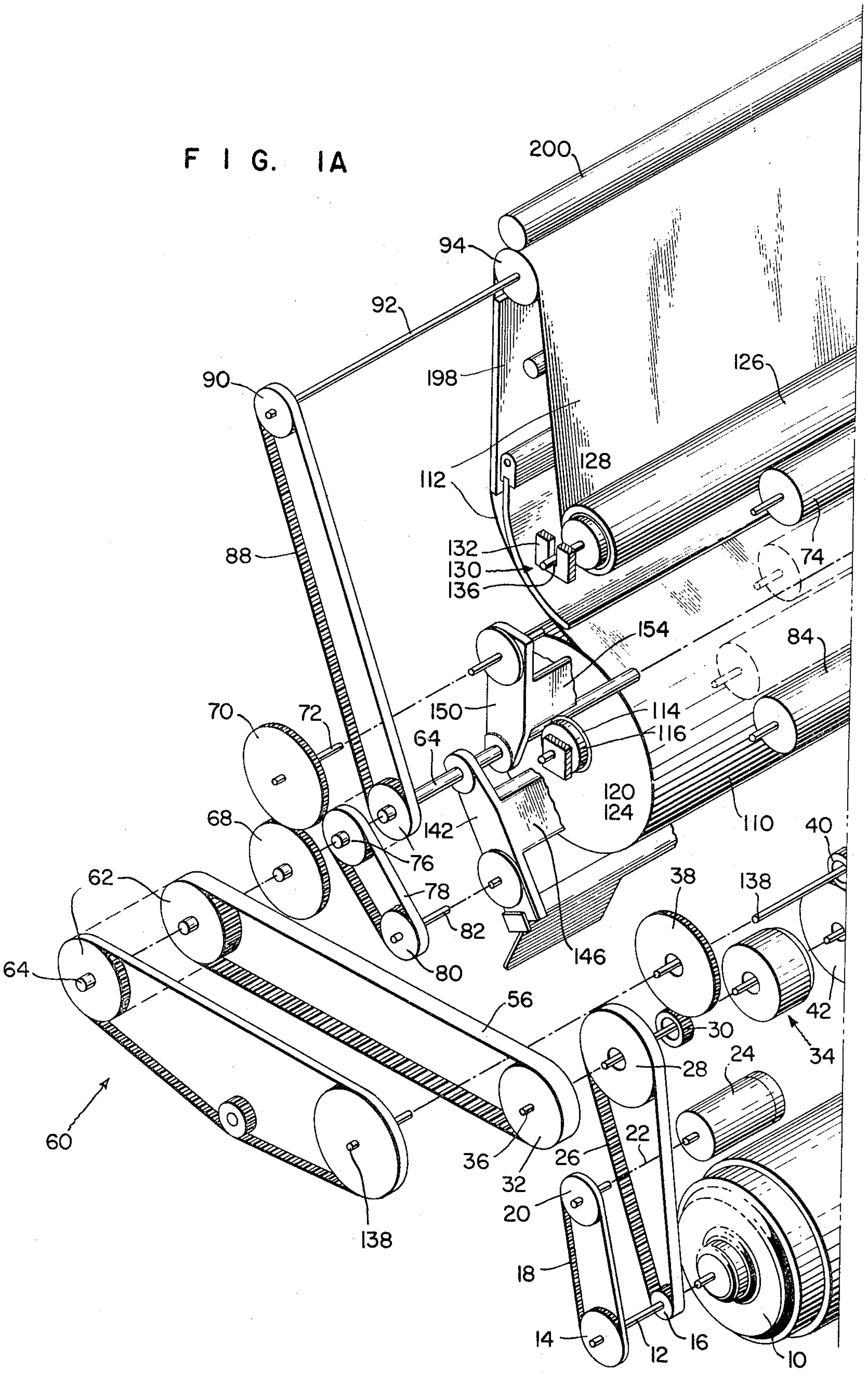

FIG. 1A of the drawing shows a reversible motor 10 having a motor shaft 12 on which there is mounted two gear pulleys 14, 16. The gear pulley 14 drives a toothed belt 18 which in turn drives a second gear pulley 20 and a shaft 22 of a tachometer 24.

Figure 4:
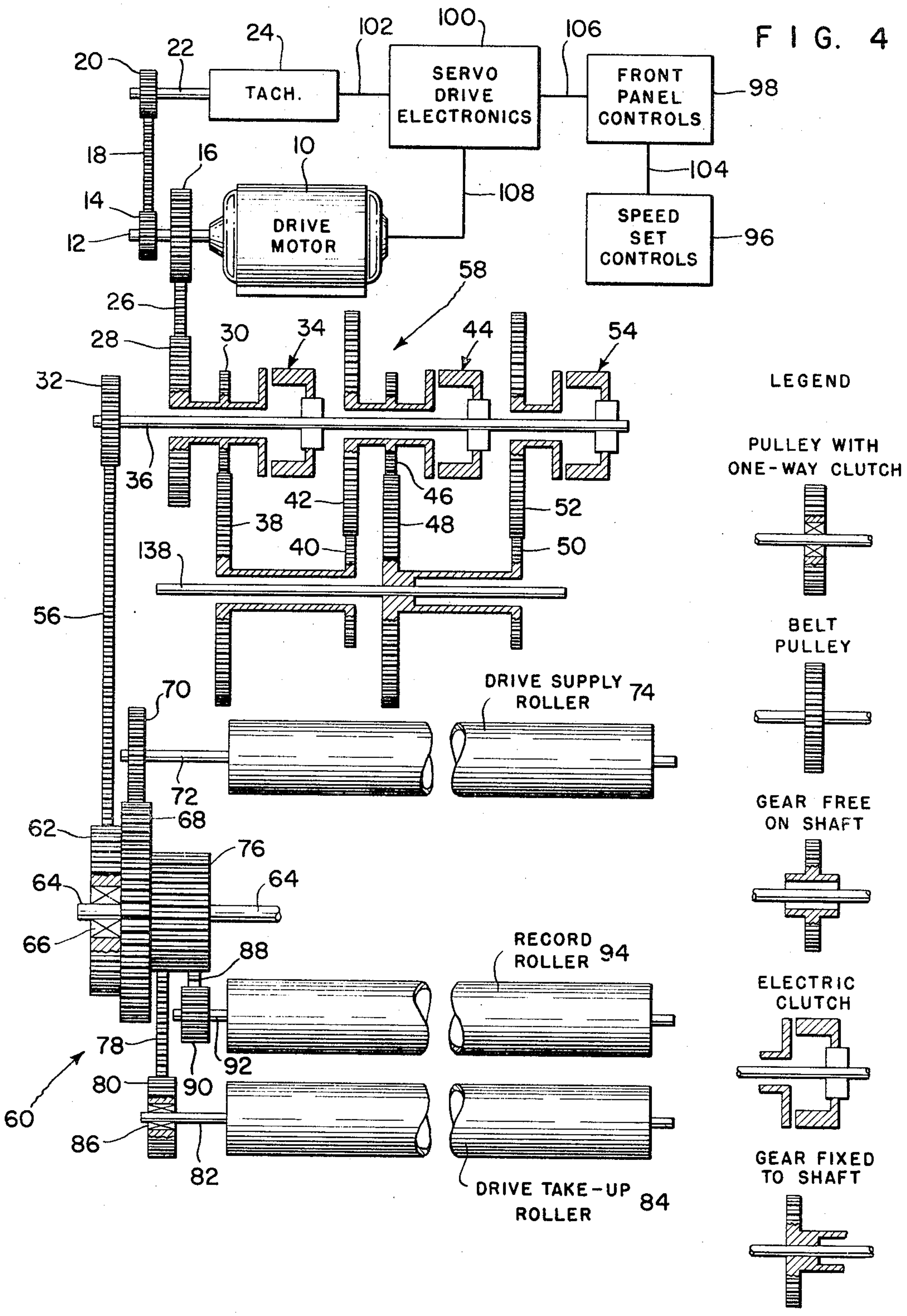
FIG. 4 is a view showing the clutch and belt drives employed for drive tensioning operation on FIGS. 1A and 1B.
Figure 5:
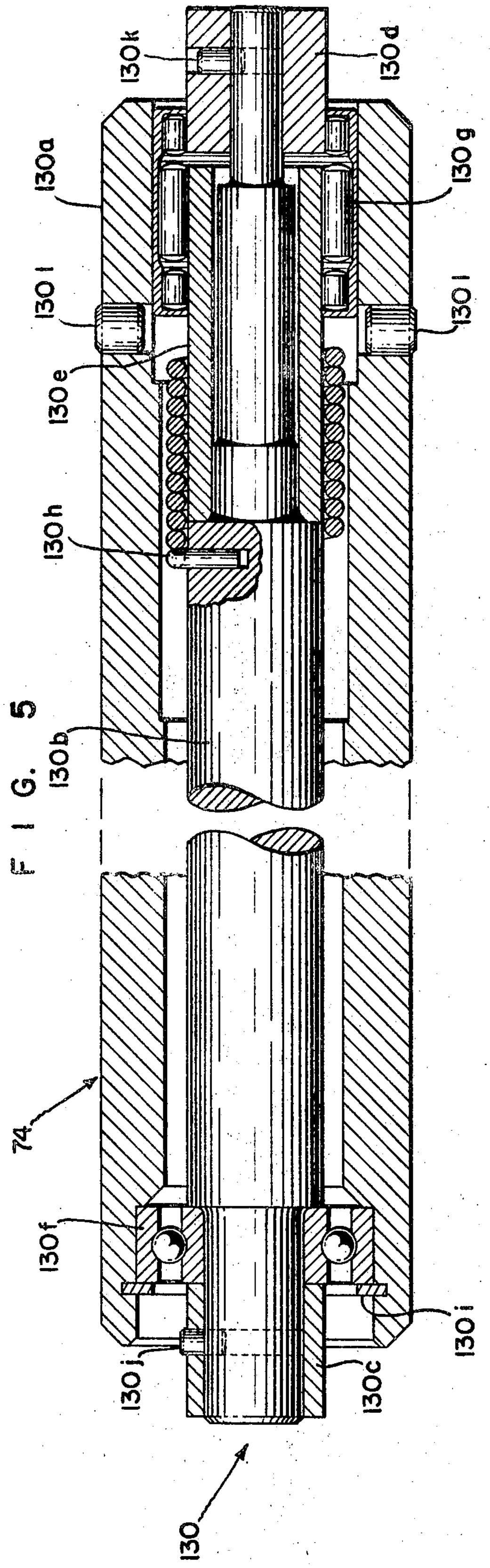
FIG. 5 shows a cross-sectional view of the supply spindle shown in FIGS. 1A and 1B.
Figure 6:
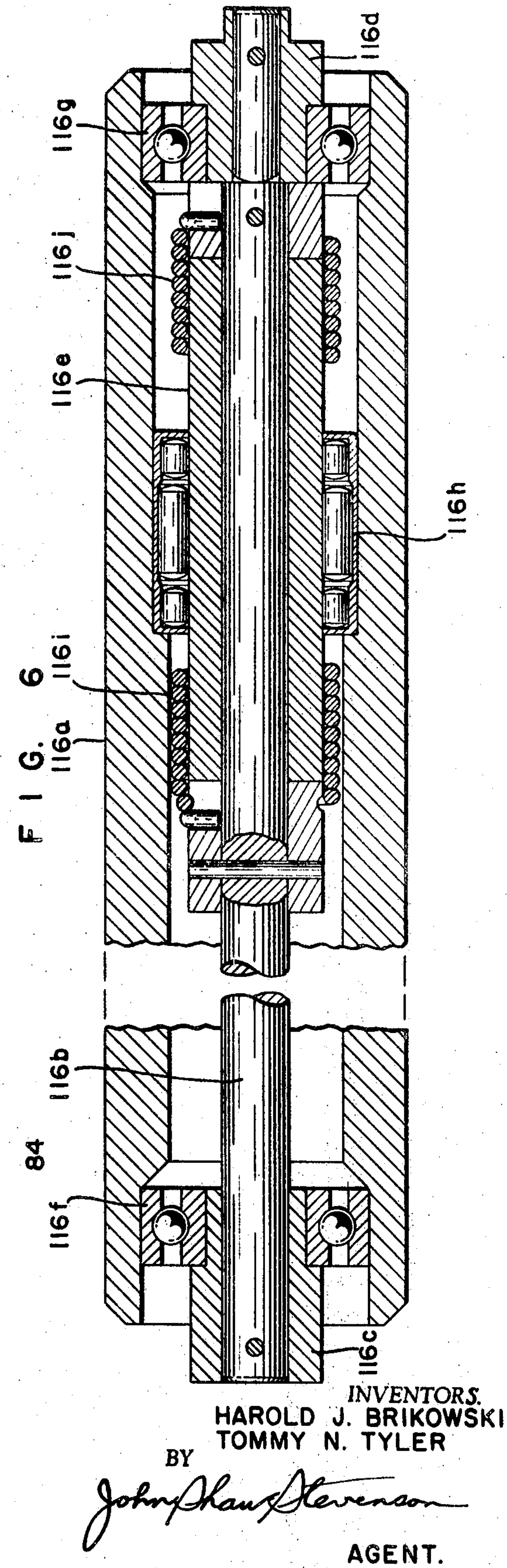
FIG. 6 shows a cross-sectional view of the take-up spindle shown in FIGS. 1A and 1B.

The other gear pulley 16 drives a toothed belt 26 which is shown best in FIG. 4 fixedly connected to high speed gears 28 and gear 30 to a gear 32 by way of a first electric clutch 34 and a shaft 36 when the clutch 34 is energized to a closed position by a conventional clutch actuating switch not shown.

A medium speed drive is accomplished when the motor 10 drives the gear pulley 16, toothed belt 26, medium speed drive gears 28, 30, 38, 40, 42 and electric clutch 44 and a shaft 36 when the clutch 44 is energized to a closed position by a conventional switch not shown.

A low speed drive is accomplished when the drive motor drives the gear pulley 16 toothed belt 26, low speed drive gear 28, 30, 38, 40, 42, 46, 48, 50, 52 an electric clutch 54 and shaft 36 when the clutch 54 is energized to a closed position by a conventional switch (not shown).

A toothed belt 56 is shown in FIG. 4 in driving relation between the output gear 32 of the selected multi-speed drive unit 58 and a toothed gear cluster unit 60 which is comprised of an input toothed pulley 62 mounted on a shaft 64 and containing a one-way clutch 66 and output drive gear 68 and 70 for driving the shaft 72 and a supply drive roller 74 mounted thereon.

The gear clusters 60 also contains a toothed pulley 76 mounted on shaft 64, a belt drive 78 connecting the toothed pulley 76 in driving relation with the toothed pulley 80 mounted on a shaft 82 on which a take-up drive roller 84 is mounted. This pulley 80 also is shown containing a one-way driving clutch 86 between itself and the shaft 82.

The tooth pulley 76 has another belt drive 88 connecting the tooth pulley 76 in driving relation with the toothed pulley 90 that is mounted on a record roller shaft 92 on which a record roller 94 is also mounted.

FIG. 4 also shows in block diagram form how the tachometer 24, a speed set control unit 96, a front panel control unit 98, a servo drive electronic unit 100, and the reversible electric motor 10 can be operably connected by suitable electrical connections 102, 104, 106 and 108.

Figures 1, 1B:
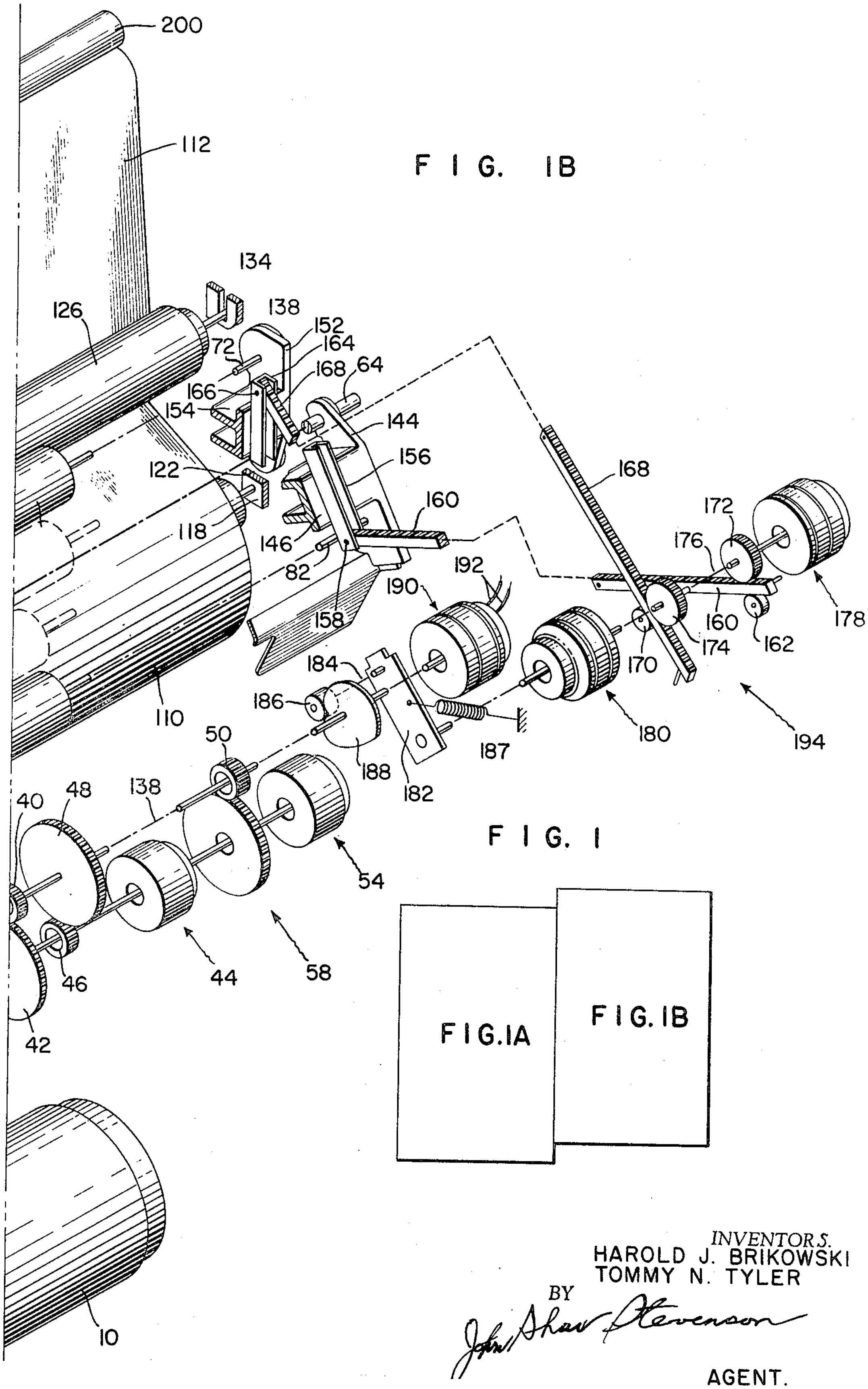
Figure 2:
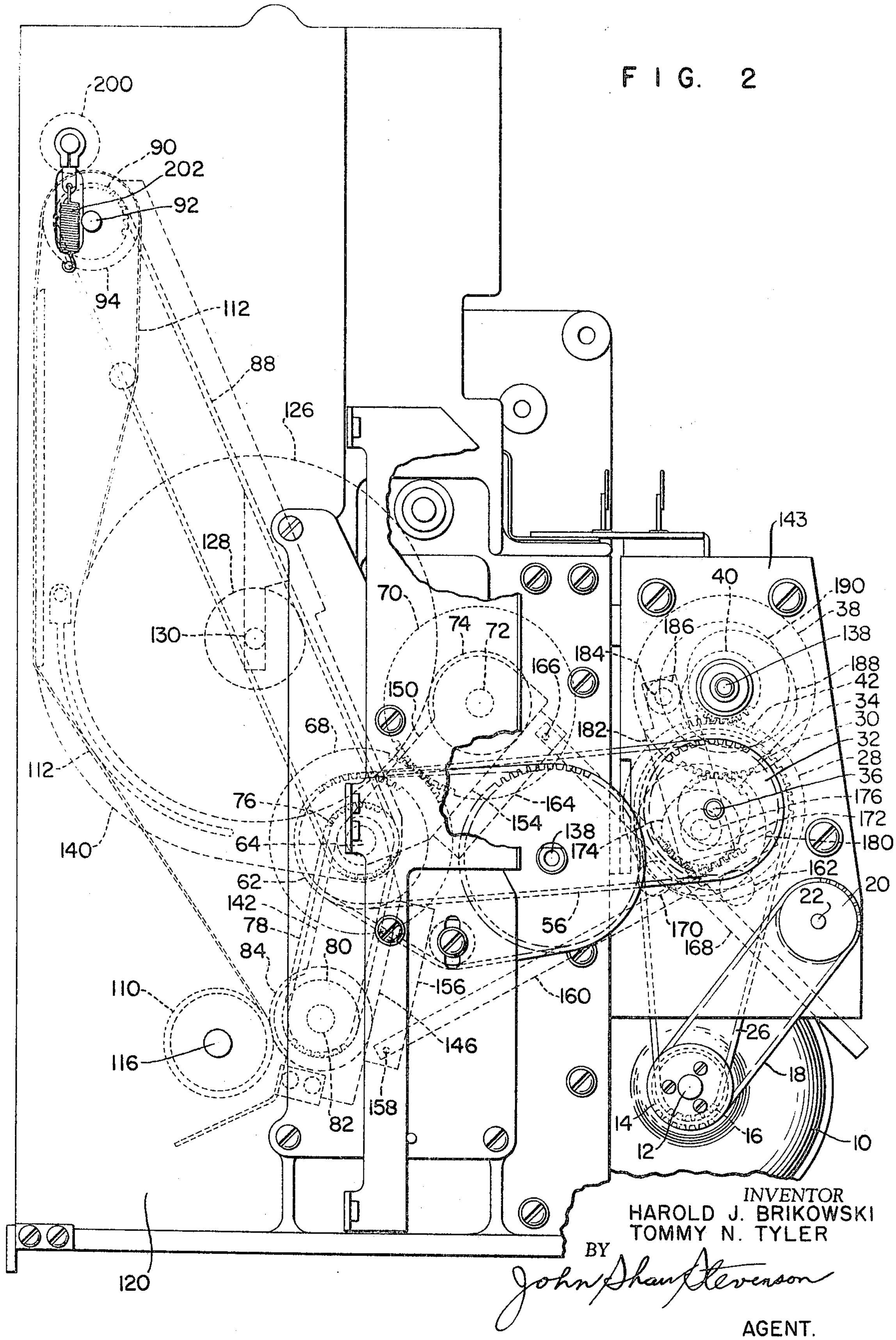
FIG. 2 is a right end elevation of FIG. 1B showing the position that the drive and tensioning units will be in when the supply spindle is loaded with a full roll of paper and a near empty roll of paper is on the take-up spindle.
Figure 3:
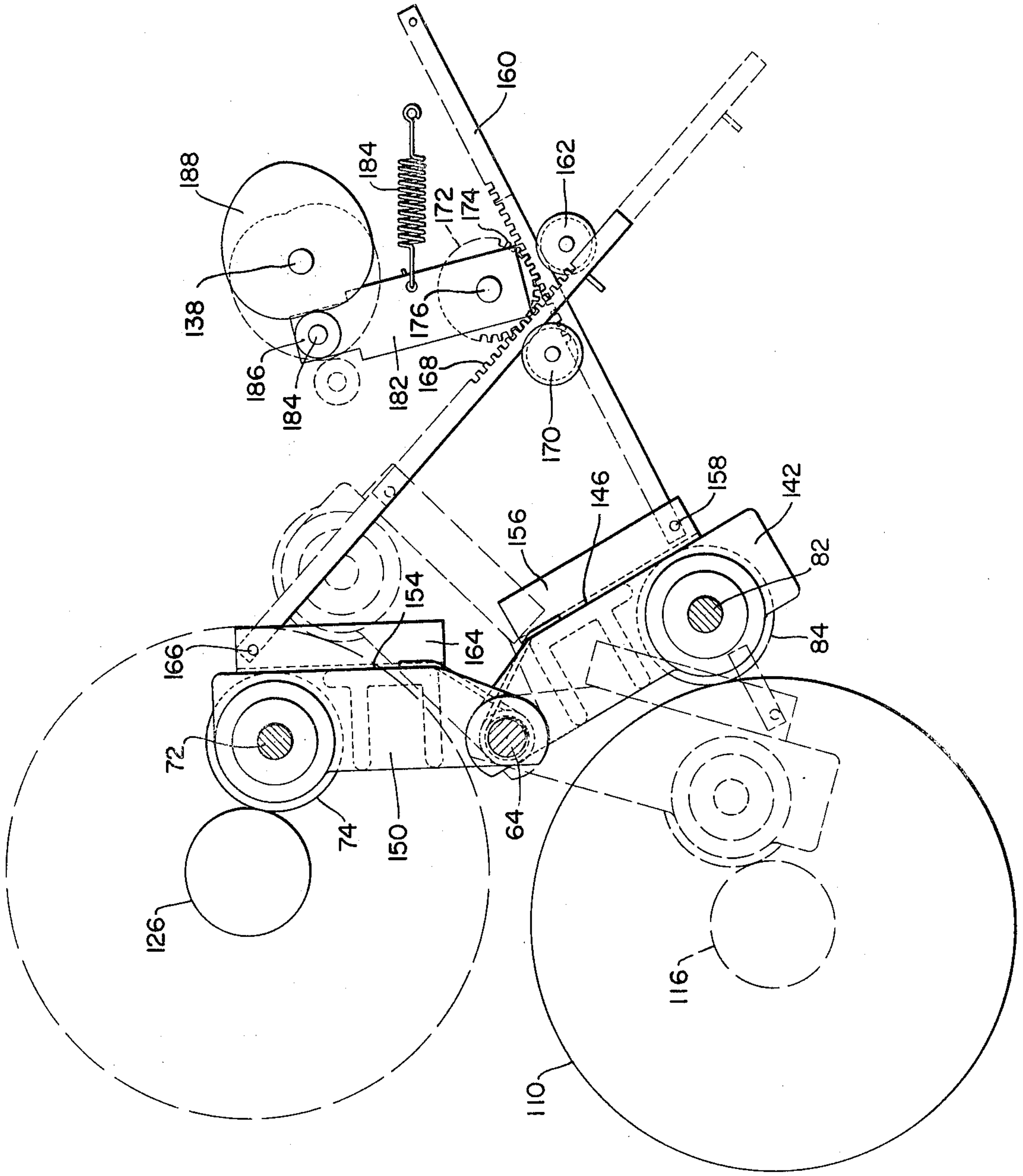
FIG. 3 is a view similar to FIG. 2 but with the casing removed and shows in solid line form the position that the drive and tensioning units will be in when a near empty roll of paper is on the supply spindle and when the take-up spindle is loaded with a full roll of paper.

FIGS. 1A, 1B and 2 show the previously mentioned take-up drive roller 84 in solid line form when it is a driving contact position with the outer surface of a take-up roll 110 of chart paper 112. This take-up roll 110 of the chart paper 112 is shown wrapped about a tubular sleeve 114, made of a suitable material for example cardboard and in turn is mounted on a take-up spindle 116. The take-up spindle unit 116 is mounted for rotatable movement on support members 118, 120 that are in turn mounted on side plates 122, 124. The take-up spindle unit 116 is comprised of sleeve shaped roller **116*a*, a spindle portion 116*b*, a left sleeve 116*c*, a right sleeve 116*d*, a floating sleeve 116*e*, ball bearings 116*f* and 116*g*, a clutch roller 130*h* and spring clutches 116*i*, 116*j***.

FIGS. 1A, 1B and 2 also show the previously mentioned supply drive roller 74 in solid line form when it is in a driving contact position within the outer surface of a supply roll 126 of the chart paper 112. This supply roll 126 of chart paper 112 is shown wrapped about a tubular sleeve 128 made of a suitable material for example cardboard that in turn is mounted on a supply spindle unit 130. The supply spindle unit 130 is shown comprised of a sleeve shaped roller **130*a*, a spindle portion 130*b*, a left sleeve 130*c*, a right sleeve 130*d*, a floating sleeve 130*e*, a ball bearing 130*f*, a clutch roller 130*g* which is of a Torrington lock type, a spring clutch 130*h*, a retaining ring 130*i*, spring pins 130*j*, 130*k*, a blade core lock 130*l* to retain the cardboard sleeve on the roller 130*a***.

With an arm lift to be hereinafter described in use, the unrolling paper roll 126 or 110, does not have back tension from the driving supply or take up roller 74 or 84 as the case may be. For this reason the one-way spring torque clutch is installed in the paper spindle units 116 and 130.

This supply spindle unit 130 is mounted for rotatable movement in supply roll bearing portions 132, 134 formed in the slide plates 136, 138 of cradle 140 shown in FIGS. 1A, 1B and FIG. 2.

The take-up drive roller 84 is mounted on shaft 82. This shaft 82 in turn is rotatably mounted by means of spring biased pivot arms 142, 144 and a tie bar 146 integral with and extending between these arms for arcuate movement with its drive gear 80 about a common drive shaft 64.

The supply drive roller 74 is mounted on shaft 72. The shaft 72 in turn is rotably mounted by means of pivot arms 150, 152, and a bar 154 integral with and extending between these arms for arcuate movement with its drive gear 70 about the common drive shaft 64.

The right end of the tie bar 146 of a U-shaped member 156 is fixably attached thereto as shown for example in FIG. 1B. A pivot pin 158 is shown passing through the sides of the U-shaped member 156 and through one end of a first gear rack 160 that is connected for pivotal movement with this U-shaped member 156.

The other end of the gear rack 160 is supported for sliding movement along a rotatable ball bearing 162 which in turn is mounted on the side plate 163 of the recorder in FIG. 2.

The right end of the tie bar 154 also has a U-shaped member 164 fixably attached thereto. A pviot pin 166 is shown passing through the sides of the U-shaped member 164 and through one of the second gear rack 168 that is connected for pivotal movement with the U-shaped member 164. The other end of the gear rack 168 is supported for sliding movement along a rotatable ball bearing 170 that in turn is mounted on a side plate of the recorder shown in FIG. 2.

The toothed side of the gear rack 160 is shown in engagement with a first driving gear 172 and the other toothed side of the gear rack 168 is shown in engagement with a second driving gear 174.

A drive shaft 176 is shown extending between each of the driving gears 172, 174 and a take-up roller clutch 178 and a supply roller clutch 180. A left end portion of the shaft 176 extending to the left of the supply clutch 180 is fixably connected to one end portion of the cam follower arm 182. The other end of the arm 182 supports a shaft 184 on which there is mounted a roller shaped cam follower 186. The arm 182 is biased by means of a spring 187 to retain the follower 186 on arm 182 in closed physical connection with the outer surface of the cam 188. When the shaft 138 on which the cam 188 is mounted is rotated and a switch, not shown, which may be mounted on a panel 98 shown in FIG. 4 is in one of two switching positions with respect to the electric leads 190, 192 shown in FIG. 1 in which the cam will be held in a dwell position on the shaft 138 and no movement of the cam follower 186 will take place. Furthermore, when the clutch 190 is engaged by applying voltage to leads 192 the cam rotates at the speed of the shaft 138. The shaft 138 is fixed to gear 48 which rotates any time the motor operates.

Reverse chart drive is accomplished by reversing the drive motor 10. The transmission 58, 60 and servo 100 are designed to operate bi-directionally. Reverse drive and the transmission utilizes an electric clutch with the attendant control circuit 96 as already explained supra. Reverse also brings into play one-way clutches 66, in the gear cluster 60 and the take-up drive roller 84. The gear cluster 60 is a drive distribution point for the record roller 94, supply drive roller 74, and take-up drive roller 84. The gear cluster clutch 66 disengages the metering record roller 94 in reverse and allows the driving roller 74 on the supply paper spindle 126 to reroll the chart paper 112. The one-way clutch 86 on the take-up driving roller 84 allows the take-up to free wheel and prevents reverse drive of the take-up roll during the time the take-up drive roll is in contact with the paper. These disengagements are necessary in reverse as will be hereinafter described under chart paper tensioning.

CHART PAPER TENSIONING

Experience has shown that fairly high paper tensions contribute to drive stability, consequently the drive and tensioning apparatus disclosed herein is constructed to maintain paper tension between the supply and take-up rolls 126 and 110. The controlling driving roll is the record roller 94 which acts as a metering roller while data is being recorded on the chart paper wrapped around it. The roller circumference is 4″, OD 1.274 so that three revolutions equal one foot.

The supply roll rack 168 is driven in the same direction as the chart paper 112 but at a slower speed achieved by a 55/60 gear reduction from the gear cluster 60 and the supply roller diameter, 1.376, to modify the gear reduction such that its peripheral velocity is about one percent less than the metering record roller 94. The angular velocity of take-up drive roller is the same as the metering record roller 94 and tension is created by increasing the diameter of take-up drive roller 84 over the metering roller for about 3% more velocity. The take-up speed also helps take-up any looseness in the paper as might remain after data observation. The driving disengagements mentioned under reverse drive prevent build up of paper slack or loops in the drive during reverse due to these speed differences.

The cam follower 186 causes the arm lift shaft and rotors of clutches 178, 180 to oscillate rotationally. The direction of paper travel determines which clutch 178 or 180 is engaged and which rack 160 or 168 is pulled to cause the arm to lift. Since the motion of the cam follower 186 is accurate and cyclic, the arms 144, 152 are lifted and lowered at the cam rotational rate. It sort of resembles an old fashioned washing machine. The arm is lifted from the unrolling paper roll and this prevents loop buildup and a fatal disturbance to the paper drive.

The embodiments of the invention in which an exclusive property or privilege is claimed are defined as follows:

1. An apparatus to move an elongated flexible medium under maximum non-breaking tension and without drive failure of said medium in both directions between two spaced apart spindles, comprising a reversible motor, first and second rotary drive members spaced from said spindles and operably connected for rotation with the motor, a means operably connected to the motor and to each of the rotary drive members to move said first rotary member into driving contact with the flexible medium on one of the spindles when the motor is rotated in one direction and to move the first rotary drive member out of engagement with the flexible medium on said one of the spindles and the second rotary drive member into driving contact with the flexible medium on the other one of the spindles when the motor is rotated in the reverse direction, the flexible medium is constructed of a web material and the first rotary member is mounted on one end of a first supporting arm, the second rotary member is mounted on one end of a second supporting arm and wherein the other end of each arm is mounted for rotation on a common shaft, and wherein a cradle is pivotly mounted on the common shaft, the cradle has a pair of walls forming slotted out passageways on each of its sides and one of the spindles has end portions thereof to support a supply roll of paper mounted thereon in slidably mounted engagement with the walls forming the slotted out passageways, a record roller is mounted for rotary movement in the sides of the cradle, a gear cluster driven by the motor is in rotary driving engagement with the record roller and a one way clutch associated with the gear cluster is operably connected to the record roller to disengage the record roller from the motor and gear cluster drive when the motor is driven in a reverse direction.

2. An apparatus to move an elongated flexible medium under maximum non-breaking tension and without drive failure of said medium in both directions between two spaced apart spindles, comprising a reversible motor, first and second rotary drive members spaced from said spindles and operably connected for rotation with the motor, a means operably connected to the motor and to each of the rotary drive members to move said first rotary member into driving contact with the flexible medium on one of the spindles when the motor is rotated in one direction and to move the first rotary drive member out of engagement with the flexible medium on said one of the spindles and the second rotary drive member into driving contact with the flexible medium on the other one of the spindles when the motor is rotated in the reverse direction, and wherein the means operably connected to the motor and each of the rotary drive members to move each member into driving contact with the flexible medium is a driving gear and an associated gear rack member connected for movement with each rotary drive member and driven by a cam and an associated cam follower that is operably connected in driving relation with the motor, and two oppositely connected electrically operated one-way clutches are operably connected to the cam follower and the rack gears, one of the clutches being operably engaged to allow the cam follower motion to be transmitted in one rotatable direction to one of the rack gears and its associated rack and drive member to drive the last mentioned rack and member toward and into driving engagement with the associated flexible medium on one of the spindles and the other of the clutches being operably engaged to enable the cam follower motion to be transmitted in an opposite one of said directions to the other rack gear and its associated rack and drive member to drive the last mentioned rack and member into driving engagement with its associated flexible medium on the other of said spindles.

3. An apparatus to move an elongated flexible medium under maximum non-breaking tension and without drive failure of said medium in both directions between two spaced apart spindles, comprising a reversible motor, first and second rotary drive members spaced from said spindles and operably connected for rotation with the motor, a means operably connected to the motor and to each of the rotary drive members to move said first rotary member into driving contact with the flexible medium on one of the spindles when the motor is rotated in one direction and to move the first rotary drive member out of engagement with the flexible medium on said one of the spindles and the second rotary drive member into driving contact with the flexible medium on the other one of the spindles when the motor is rotated in the reverse direction, and wherein the first rotary drive member is a take-up drive roller, the second rotary drive member is a supply drive roller, a gear cluster containing a one way clutch is positioned in non-driving relation between the motor and the supply drive roller and positioned in driving relation between the motor and the take-up drive roller to enable the take-up drive roller to be driven in rotary drive contact with the flexible medium on the spindle associated with the take-up drive roller when the motor is driven in a direct unwinding direction and a clutch associated with the supply drive roller and its associated spindle to enable free wheeling of the supply drive roller and spindle when the motor rotates in said direct unwinding direction and the flexible medium is being pulled by the take-up drive roller from the spindle associated with the supply drive roller towards and about the spindle associated with the take-up drive roller.

4. An apparatus to move an elongated flexible medium under maximum non-breaking tension and without drive failure of said medium in both directions between two spaced apart spindles, comprising a reversible motor, first and second rotary drive members spaced from said spindles and operably connected for rotation with the motor, a means operably connected to the motor and to each of the rotary drive members to move said first rotary member into driving contact with the flexible medium on one of the spindles when the motor is rotated in one direction and to move the first rotary drive member out of engagement with the flexible medium on said one of the spindles and the second rotary drive member into driving contact with the flexible medium on the other one of the spindles when the motor is rotated in the reverse direction, and wherein the first rotary drive member is a take-up drive roller, the second rotary drive member is a supply drive roller, a gear cluster containing a one-way clutch is positioned in driving relation between the motor and the supply drive roller, to enable the supply drive roller to be driven by the motor in rotary drive contact with the flexible medium on the spindle associated with the supply drive roller when the motor is driven in a reverse rewinding direction and one way clutch means associated with the take-up drive roller and its associated spindle to enable free wheeling of the take-up drive roller and its associated spindles when the motor rotates in the said reverse rewinding direction and the flexible medium is being pulled by the supply drive roller from the spindle associated with the take-up drive roller towards and about the spindle associated with the supply drive roller.

5. An apparatus to move an elongated flexible medium under maximum non-breaking tension and without drive failure of said medium in both directions between two spaced apart spindles, comprising a reversible motor, first and second rotary drive members spaced from said spindles and operably connected for rotation with the motor, a means operably connected to the motor and to each of the rotary drive members to move said first rotary member into driving contact with the flexible medium on one of the spindles when the motor is rotated in one direction and to move the first rotary drive member out of engagement with the flexible medium on said one of the spindles and the second rotary drive member into driving contact with the flexible medium on the other one of the spindles when the motor is rotated in the reverse direction, and wherein the means operably connected to the motor and each of the rotary drive members to move each member into driving contact with the flexible medium is a driving gear and an associated gear rack member connected for movement with each rotary drive member and driven by a cam and an associated cam follower that is operably connected in driving relation with the motor, and two oppositely connected electrically operated one-way clutches are operably connected to the cam follower and the rack gears, one of the clutches being operably engaged to allow the cam follower motion to be transmitted in one rotatable direction to one of the rack gears and its associated rack and drive member to drive the last mentioned rack and member toward and into driving engagement with the associated flexible medium on one of the spindles and the other of the clutches being operably engaged to enable the cam follower motion to be transmitted in an opposite one of said directions to the other rack gear and its associated rack and drive member to drive the last mentioned rack and member into driving engagement with its associated flexible medium on the other of said spindles, and wherein the cam is operably connected by way of a gear speed reducing means and a multi-speed drive unit in driving relation with the motor when the rotary drive members are driving the flexible medium between the spindles; and wherein an electric clutch is operably connected to the cam to disconnect the cam from the motor drive when a change in the speed of the multi-speed drive unit in either of said flexible medium driving directions is effected.

6. An apparatus to move an elongated flexible medium under maximum non-breaking tension and without drive failure of said medium in both directions between two spaced apart spindles, comprising a reversible motor, first and second rotary drive members spaced from said spindles and operably connected for rotation with the motor, a means operably connected to the motor and to each of the rotary drive members to move said first rotary member into driving contact with the flexible medium on one of the spindles when the motor is rotated in one direction and to move the first rotary drive member out of engagement with the flexible medium on said one of the spindles and the second rotary drive member into driving contact with the flexible medium on the other one of the spindles when the motor is rotated in the reverse direction, and wherein the means operably connected to the motor and to each of the rotary drive members is comprised of a first lift clutch unit associated with one of the rotary drive members and a second lift clutch unit operably connected to the other rotary drive member, the first and second lift clutches each being operable to cut off the rotary motion of the motor drive transmitted to each of their associated rotary drive members when a speed change in the direction in which the other one of the two rotary drive members to be driven is effected.

References Cited

UNITED STATES PATENTS

| | | | |
|---|---|---|---|
| 1,913,176 | 6/1933 | Twiss | 242—67.2 |
| 2,059,879 | 11/1936 | La Pierre | 242—67.2 |
| 2,673,041 | 3/1954 | Hittle | 242—55.12 |
| 2,845,232 | 7/1958 | Johnson et al. | 242—67.2 |
| 2,896,873 | 7/1959 | Mageoch | 242—67.4 |
| 3,281,090 | 10/1966 | Baranowski | 242—67.3 |

FOREIGN PATENTS

| | | |
|---|---|---|
| 1,133,313 | 11/1956 | France. |

GEORGE F. MAUTZ, Primary Examiner